(12) United States Patent
Veeramani et al.

(10) Patent No.: US 11,582,270 B2
(45) Date of Patent: *Feb. 14, 2023

(54) TECHNOLOGIES FOR SCALABLE CAPABILITY DETECTION FOR MULTIMEDIA CASTING

(71) Applicant: Intel Corporation, Santa Clara, CA (US)

(72) Inventors: Karthik Veeramani, Hillsboro, OR (US); Preston J. Hunt, Portland, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/510,009

(22) Filed: Oct. 25, 2021

(65) Prior Publication Data
US 2022/0224730 A1 Jul. 14, 2022

Related U.S. Application Data

(63) Continuation of application No. 16/705,386, filed on Dec. 6, 2019, now Pat. No. 11,159,583, which is a (Continued)

(51) Int. Cl.
*G06F 15/16* (2006.01)
*H04L 65/1069* (2022.01)
(Continued)

(52) U.S. Cl.
CPC ........ *H04L 65/1069* (2013.01); *H04L 65/611* (2022.05); *H04L 65/612* (2022.05); *H04L 69/24* (2013.01)

(58) Field of Classification Search
CPC ....... H04L 65/612; H04L 65/611; H04L 69/24
(Continued)

(56) References Cited

U.S. PATENT DOCUMENTS 6,594,699 B1 7/2003 Sahai et al.
8,315,307 B2 11/2012 Chen et al.
(Continued)

FOREIGN PATENT DOCUMENTS

CA 3038506 A1 * 10/2020
CN 104662949 5/2015
(Continued)

OTHER PUBLICATIONS

International Searching Authority, "International Search Report," mailed in connection with International Patent Application No. PCT/US2016/052613, dated Dec. 20, 2016, 3 pages.
(Continued)

*Primary Examiner* — Khanh Q Dinh
(74) *Attorney, Agent, or Firm* — Hanley, Flight & Zimmerman, LLC

(57) ABSTRACT

Technologies for casting digital media content include a source computing device communicatively coupled to a destination computing device. The source computing device is configured to transmit a set of identifiers of the source computing device to the destination computing device and receive a set of identifiers of the destination computing device from the destination computing device. Each set of identifiers includes a version (e.g., hardware or software) associated with the respective computing device and a unique identifier of the respective computing device. The source computing device is additionally configured to determine a subset of casting session parameters from a set of casting session parameters based on the one or more capabilities of the destination computing device which are usable by the destination computing device to establish a casting session and stream digital media content in accordance with the subset of casting session parameters. Other embodiments are described and claimed.

15 Claims, 8 Drawing Sheets

Related U.S. Application Data continuation of application No. 14/998,252, filed on Dec. 26, 2015, now Pat. No. 10,505,994.

(60) Provisional application No. 62/244,019, filed on Oct. 20, 2015.

(51) Int. Cl.
*H04L 69/24* (2022.01)
*H04L 65/611* (2022.01)
*H04L 65/612* (2022.01)

(58) Field of Classification Search
USPC .............................. 709/220, 224, 226, 228
See application file for complete search history.

(56) References Cited

U.S. PATENT DOCUMENTS

| | | | |
|---|---|---|---|
| 9,003,458 | B2 | 4/2015 | Gonder et al. |
| 9,206,309 | B2 | 12/2015 | Appleby et al. |
| 9,315,663 | B2 | 4/2016 | Appleby et al. |
| 9,380,088 | B2 | 6/2016 | Jennings et al. |
| 9,674,575 | B2 | 6/2017 | Jennings et al. |
| 9,681,161 | B2 | 6/2017 | Gonder et al. |
| 10,347,293 | B1 * | 7/2019 | Skinner ................. G06F 3/1454 |
| 10,505,994 | B2 * | 12/2019 | Veeramani .......... H04L 65/1069 |
| 10,826,947 | B2 | 11/2020 | Smith et al. |
| 10,851,929 | B2 | 12/2020 | Tiberghien et al. |
| 11,159,583 | B2 * | 10/2021 | Veeramani ............ H04L 65/756 |
| 2003/0065803 | A1 | 4/2003 | Heuvelman |
| 2005/0010963 | A1 * | 1/2005 | Zeng ........................ H04L 9/40 725/139 |
| 2005/0175030 | A1 | 8/2005 | Moon et al. |
| 2007/0002840 | A1 | 1/2007 | Song et al. |
| 2009/0164648 | A1 * | 6/2009 | Xu ...................... H04L 12/1868 709/228 |
| 2011/0189440 | A1 | 8/2011 | Appleby et al. |
| 2012/0023522 | A1 | 1/2012 | Anderson et al. |
| 2012/0197971 | A1 * | 8/2012 | Jiang ..................... G06F 16/957 709/203 |
| 2012/0266132 | A1 | 10/2012 | Coppinger et al. |
| 2013/0097333 | A1 * | 4/2013 | Bathurst ............. H04L 65/1101 709/231 |
| 2013/0338267 | A1 | 12/2013 | Appleby et al. |
| 2014/0184743 | A1 | 7/2014 | Chen et al. |
| 2015/0222688 | A1 | 8/2015 | Vedula et al. |
| 2015/0341405 | A1 | 11/2015 | Jennings et al. |
| 2016/0344782 | A1 | 11/2016 | Cheng et al. |
| 2016/0380823 | A1 * | 12/2016 | Shen ...................... H04L 45/00 370/254 |
| 2017/0111403 | A1 * | 4/2017 | Veeramani ............ H04L 65/756 |
| 2018/0227334 | A1 | 8/2018 | Oyman |
| 2019/0215327 | A1 * | 7/2019 | Murthy ................. H04L 63/107 |
| 2020/0358831 | A1 | 11/2020 | Veeramani et al. |
| 2021/0250395 | A1 * | 8/2021 | VanBlon ................. H04L 65/60 |

FOREIGN PATENT DOCUMENTS

| | | |
|---|---|---|
| CN | 103858406 | 2/2017 |
| EP | 2180664 | 4/2010 |

OTHER PUBLICATIONS

International Searching Authority, "Written Opinion," mailed in connection with International Patent Application No. PCT/US2016/052613, dated Dec. 20, 2016, 6 pages.

European Patent Office, "Extended European Search Report," mailed in connection with European Patent Application No. 16857964.7, dated Mar. 21, 2019, 8 pages.

United States Patent and Trademark Office, "Notice of Allowance," mailed in connection with U.S. Appl. No. 14/998,252, dated Aug. 8, 2019, 8 pages.

United States Patent and Trademark Office, "Non-final Office Action," mailed in connection with U.S. Appl. No. 14/998,252, dated Jan. 25, 2019, 12 pages.

European Patent Office, "Communication Pursuant to Article 94(3) EPC," mailed in connection with European Patent Application No. 16857964.7, dated Apr. 13, 2021, 4 pages.

United States Patent and Trademark Office, "Non-final Office Action," mailed in connection with U.S. Appl. No. 16/705,386, dated Mar. 3, 2021, 7 pages.

United States Patent and Trademark Office, "Notice of Allowance," mailed in connection with U.S. Appl. No. 16/705,386, dated Jun. 24, 2021, 8 pages.

State Intellectual Patent Office "Office Action" received in Chinese Patent Application No. 201680054537.3 dated Aug. 4, 2020, 16 pages.

* cited by examiner

TECHNOLOGIES FOR SCALABLE CAPABILITY DETECTION FOR MULTIMEDIA CASTING

CROSS-REFERENCE TO RELATED APPLICATIONS

This patent arises from a continuation of U.S. patent application Ser. No. 16/705,386 (now U.S. Pat. No. 11,159, 583), entitled "TECHNOLOGIES FOR SCALABLE CAPABILITY DETECTION FOR MULTIMEDIA CASTING," and filed on Dec. 6, 2019, which is a continuation of U.S. patent application Ser. No. 14/998,252 (now U.S. Pat. No. 10,505,994), entitled "TECHNOLOGIES FOR SCALABLE CAPABILITY DETECTION FOR MULTIMEDIA CASTING," and filed on Dec. 26, 2015, which claims the benefit of and priority to U.S. Provisional Patent Application No. 62/244,019, entitled "TECHNOLOGIES FOR SCALABLE CAPABILITY DETECTION FOR MULTIMEDIA CASTING," filed on Oct. 20, 2015. U.S. patent application Ser. No. 16/705,386, U.S. patent application Ser. No. 14/998,252 and U.S. Provisional Patent Application No. 62/244,019 are hereby incorporated herein by reference in their entireties.

BACKGROUND

Traditionally, playback of digital media content (e.g., movies, music, pictures, games, etc.) has been constrained to the computing device (e.g., desktop computer, smartphone, tablet, wearable, gaming system, television, etc.) on which the digital media content was stored. However, with the advent of cloud computing related technologies and increased capabilities of computing devices, services such as digital media content transmission services (i.e., streaming, casting, mirroring, etc.) have spurred along the generation, sharing, and consumption of digital media content as consumer devices capable of interacting with such content have become ubiquitous. The desire to share digital media content between consumer interfacing computing devices, especially in a home environment, is increasing in tandem with the increased exposure of consumers to the digital media content and providers of such digital media content.

The introduction of cast-enabled computing devices has enabled digital media content to be cast from one computing device to another compatible computing device (e.g., a smart television, a speaker, etc.) directly, or indirectly, such as via a compatible hub, dongle, etc., connected to the other computing device. In other words, digital media content stored on one computing device is transmitted and rendered at a receiving computing device. Present solutions allow manufacturer agnostic wireless casting of the digital media content using various wireless communication technologies employed by computing devices supporting Wi-Fi®, Digital Living Network Alliance (DLNA), Bluetooth®, etc. Additionally, other present solutions allow the digital media content to be cast or otherwise streamed over wired communication technologies, such as High-Definition Multimedia Interface (HDMI), Universal Serial Bus (USB), and the like.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
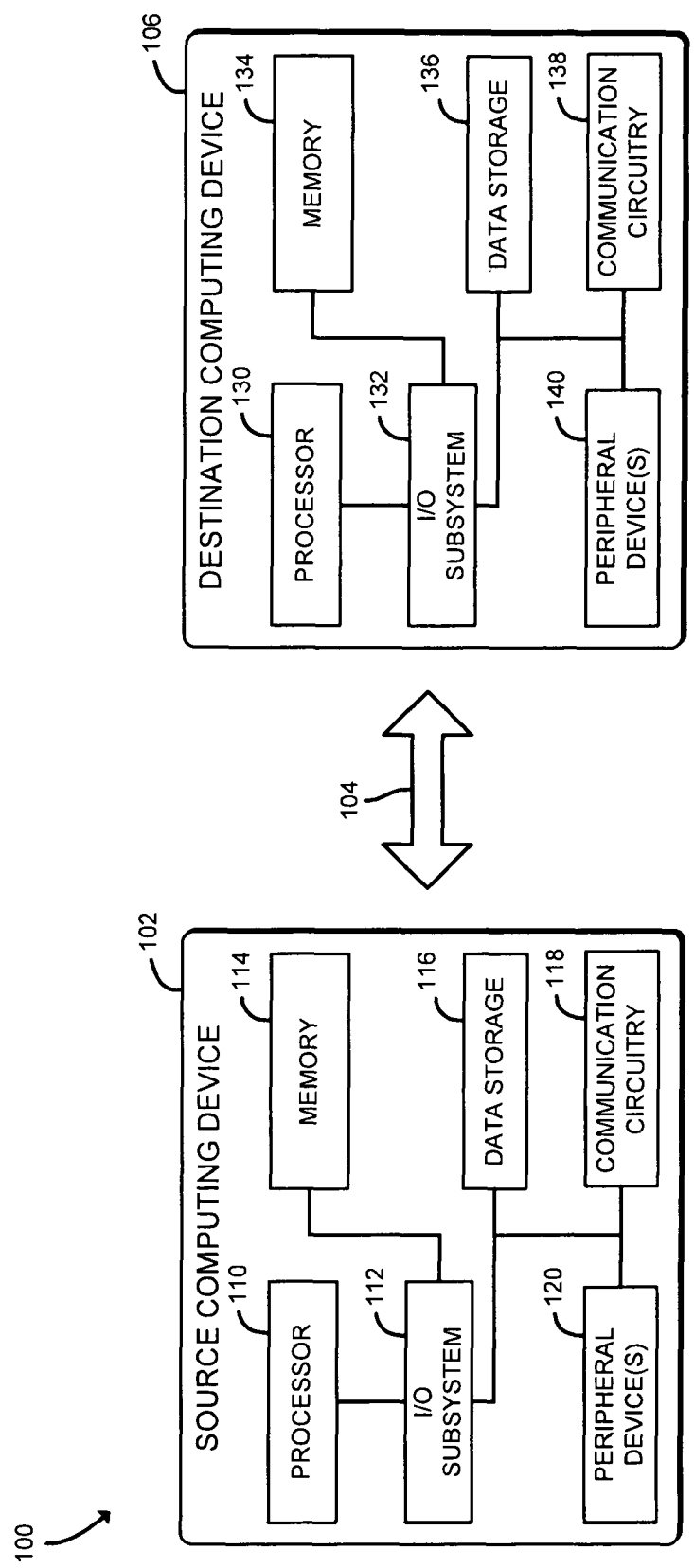
FIG. 1 is a simplified block diagram of at least one embodiment of a system for scalable capability detection for multimedia casting.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for scalable capability detection for multimedia casting includes a source computing device 102 communicatively coupled to a destination computing device 106 via a communication channel 104. In use, the source computing device 102 transmits (e.g., casts, streams, mirrors, etc.) digital media content (e.g., video, audio, text, etc.) to the destination computing device 106 via the communication channel 104, which may be established over a wired or wireless connection. As will be described in further detail, prior to transmitting the digital content, and subsequent to establishing the communication channel 104 (e.g., a TCP connection via the network layer, or layer 3, of the Open Systems Interconnection (OSI) model using a negotiated IP address), the source computing device 102 and the destination computing device 106 perform a capability negotiation (see, e.g., the capability negotiation flow of FIG. 4) in the network layer, or above, of the OSI model.

Unlike present technologies, which just send all identifying data during the capability negotiation, the source computing device 102 and the destination computing device 106 are configured to first exchange identifying information (e.g., an installed software version, a unique identifier associated with a manufacturer of the source computing device 102, a unique identifier associated with a manufacturer of the destination computing device 106, etc.) during the capability negotiation such that only a portion of the identifying data may be required to be transferred. Such unnecessary data may include data that is not supported by the destination computing device 106, thereby resulting in wasted cycles to process the data, introducing latency.

For example, in an embodiment wherein the source computing device 102 and the destination computing device 106 support different versions of a particular software, only certain features of the software are likely to be compatible with both devices. In such an embodiment, sending the unsupported features results in extra, unnecessary data being sent from the source computing device 102 to the destination computing device 106, which requires additional, unnecessary processing by the receiving computing device. However, if each of the source computing device 102 and the destination computing device 106 have been made aware of the other computing device's supported capabilities prior to sending such information in subsequent exchanges, the wasted processing cycles and latency associated with transmitting, receiving, and/or processing the unnecessary data is eliminated.

For example, in an embodiment wherein each version of a particular software includes fifteen feature parameters, the source computing device 102 supports version ten of that software, and the destination computing device 106 supports version one of that particular software. In such an embodiment, using present technologies, the source computing device 102 would send all of the feature parameters for each version (i.e., fifteen feature parameters per version over ten versions in the provided example, for a total of 150 feature parameters) to the destination computing device 106 during the capability exchange and negotiation. However, since the destination computing device 106 in the example only supports fifteen of the 150 feature parameters received from the source computing device 102, processing cycles are wasted parsing through data that includes a feature parameter set of 135 unusable feature parameters. In contrast, the present invention's exchange of identifying information in the context of the aforementioned example would make the source computing device 102 aware of the capabilities of the destination computing device 106 prior to transmission of the unusable feature parameters. Accordingly, the source computing device 102 can isolate the fifteen feature parameters supported by the destination computing device 106 from the 150 feature parameters and only transmit those fifteen supported feature parameters, thereby eliminating the wasted processing cycles and latency associated with transmission and processing of the other unsupported feature parameters.

The source computing device 102 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability, a computer, a server (e.g., stand-alone, rack-mounted, blade, etc.), a network appliance (e.g., physical or virtual), a web appliance, a distributed computing system, a processor-based system, a multiprocessor system, and/or any other computing/communication device.

The illustrative source computing device 102 includes a processor 110, an input/output (I/O) subsystem 112, a memory 114, a data storage device 116, communication circuitry 118, and one or more peripheral devices 120. Of course, in other embodiments, the source computing device 102 may include other or additional components, such as those commonly found in a computing device. Additionally, in some embodiments, one or more of the illustrative components may be incorporated in, or otherwise form a portion of, another component. For example, the memory 114, or portions thereof, may be incorporated in the processor 110 in some embodiments. Further, in some embodiments, one or more of the illustrative components may be omitted from the source computing device 102.

The processor 110 may be embodied as any type of processor capable of performing the functions described herein. For example, the processor 110 may be embodied as a single or multi-core processor(s), digital signal processor, microcontroller, or other processor or processing/controlling circuit. The memory 114 may be embodied as any type of volatile or non-volatile memory or data storage capable of performing the functions described herein. In operation, the memory 114 may store various data and software used during operation of the source computing device 102, such as operating systems, applications, programs, libraries, and drivers.

The memory 114 is communicatively coupled to the processor 110 via the I/O subsystem 112, which may be embodied as circuitry and/or components to facilitate input/output operations with the processor 110, the memory 114, and other components of the source computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and/or other components of the source computing device 102, on a single integrated circuit chip.

The data storage device 116 may be embodied as any type of device or devices configured for short-term or long-term storage of data, such as memory devices and circuits, memory cards, hard disk drives, solid-state drives, or other data storage devices, for example. It should be appreciated that the data storage device 116 and/or the memory 114 (e.g., the computer-readable storage media) may store various types of data capable of being executed by a processor (e.g., the processor 110) of the source computing device 102, including operating systems, applications, programs, libraries, drivers, instructions, etc.

The communication circuitry 118 may be embodied as any communication circuit, device, or collection thereof, capable of enabling communications between the source computing device 102 and other computing devices (e.g., the destination computing device 106) over a wired or wireless communication channel (e.g., the communication channel 104). For example, the communication circuitry 118 may include a network interface controller (NIC) and/or other devices capable of performing networking-related operations. The communication circuitry 118 may be configured to use any one or more wired or wireless communication technologies and associated protocols (e.g., Ethernet, Wi-Fi®, Bluetooth®, Bluetooth® Low Energy (BLE), near-field communication (NFC), Worldwide Interoperability for Microwave Access (WiMAX), Digital Living Network Alliance (DLNA), etc.) to affect such communication. The communication circuitry 118 may be additionally configured to use any one or more wireless and/or wired communication technologies and associated protocols to effect communication with other computing devices, such as over a network, for example.

The peripheral devices 120 may include any number of input/output devices, interface devices, and/or other peripheral devices. For example, in some embodiments, the peripheral devices 120 may include a display, a touch screen, graphics circuitry, a keyboard, a mouse, a microphone, a speaker, and/or other input/output devices, interface devices, and/or peripheral devices. The particular devices included in the peripheral devices 120 may depend on, for example, the type and/or intended use of the source computing device 102. The peripheral devices 120 may additionally or alternatively include one or more ports, such as a USB port, for example, for connecting external peripheral devices to the source computing device 102.

The destination computing device 106 may be embodied as any type of computation or computing device capable of performing the functions described herein, including, without limitation, a computer, a portable computing device (e.g., smartphone, tablet, laptop, notebook, wearable, etc.), a television, a cast hub, a cast dongle, a processor-based system, and/or a multiprocessor system. Similar to the illustrative source computing device 102, the destination computing device 106 includes a processor 130, an I/O subsystem 132, a memory 134, a data storage device 136, communication circuitry 138, and one or more peripheral devices 140. As such, further descriptions of the like components are not repeated herein with the understanding that the description of the corresponding components provided above in regard to the source computing device 102 applies equally to the corresponding components of the destination computing device 106.

Figure 2:
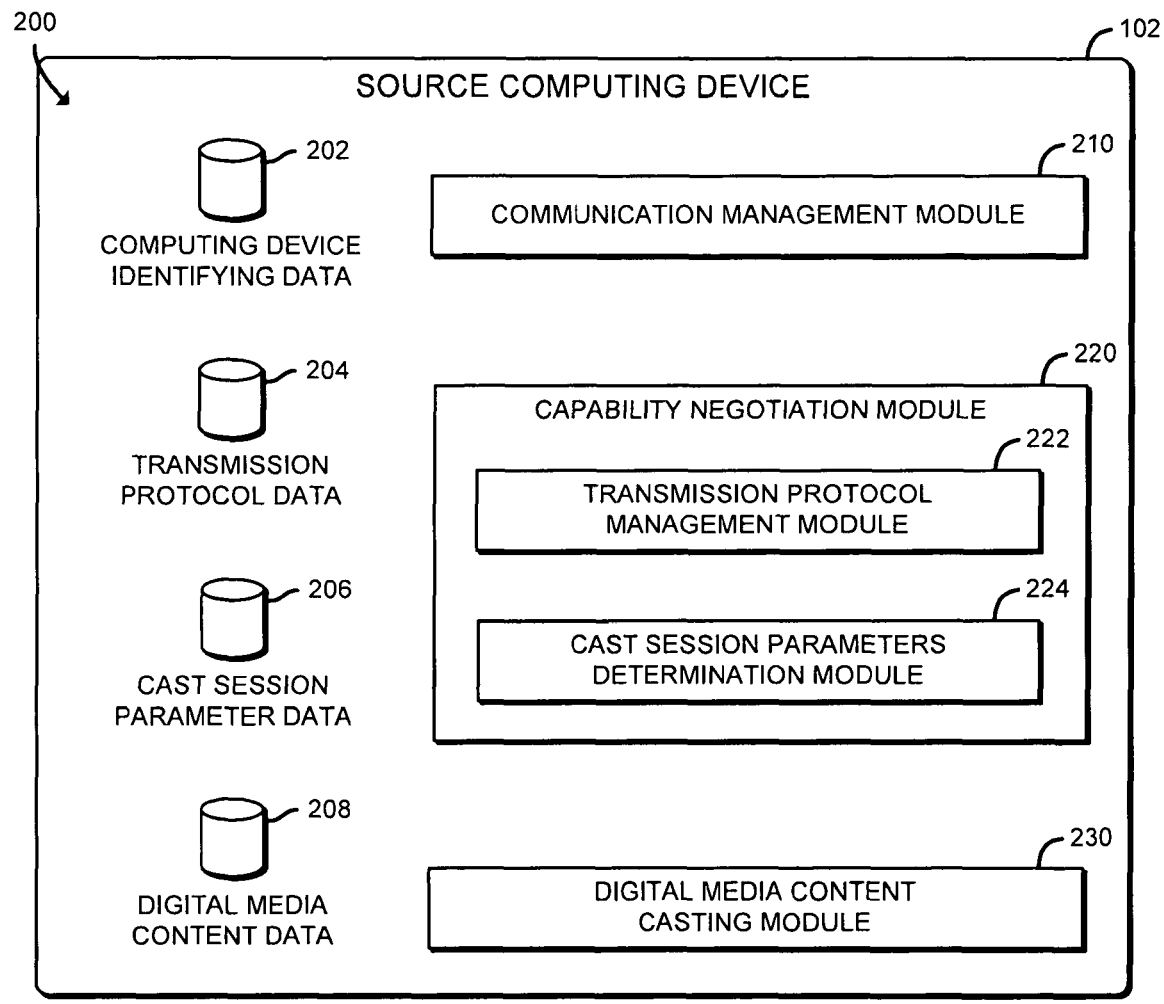
FIG. 2 is a simplified block diagram of at least one embodiment of an environment of the source computing device of the system of FIG. 1.

Referring now to FIG. 2, in an illustrative embodiment, the source computing device 102 establishes an environment 200 during operation. The illustrative environment 200 includes a communication management module 210, a capability negotiation module 220, and a digital media content casting module 230. The various modules of the environment 200 may be embodied as hardware, firmware, software, or a combination thereof. As such, in some embodiments, one or more of the modules of the environment 200 may be embodied as circuitry or collection of electrical devices (e.g., a communication management circuit 210, a capability negotiation circuit 220, a digital media content casting circuit 230, etc.).

It should be appreciated that, in such embodiments, one or more of the communication management circuit 210, the capability negotiation circuit 220, and the digital media content casting circuit 230 may form a portion of one or more of the processor 110, the I/O subsystem 112, and/or other components of the source computing device 102. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 110 or other components of the source computing device 102.

In the illustrative environment 200, the source computing device 102 includes computing device identifying data 202, transmission protocol data 204, cast session parameter data 206, and digital media content data 208, each of which may be accessed by the various modules and/or sub-modules of the source computing device 102. It should be appreciated that the source computing device 102 may include additional and/or alternative components, sub-components, modules, sub-modules, and/or devices commonly found in a computing device, which are not illustrated in FIG. 2 for clarity of the description.

The communication management module 210, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the source computing device 102. To do so, the communication management module 210 is configured to receive and process network packets from other computing devices (e.g., the destination computing device 106 and/or other computing device(s) communicatively coupled to the source computing device 102). Additionally, the communication management module 210 is configured to prepare and transmit network packets to another computing device (e.g., the destination computing device 106 and/or other computing device(s) communicatively coupled to the source computing device 102).

The communication management module 210 is further configured to establish a communication channel at the network layer (i.e., the IP layer) with the computing devices with which the source computing device 102 is communicatively coupled. Accordingly, in some embodiments, at least a portion of the functionality of the communication management module 210 may be performed by the communication circuitry 118 of the source computing device 102

(e.g., a MC of the communication circuitry 118). In some embodiments, data used to couple to the other computing devices (e.g., Wi-Fi Direct pairing credentials, an identifier of the source computing device 102, an identifier of the destination computing device 106, etc.) may be stored in the computing device identifying data 202, which may be retrieved and utilized for future coupling attempts (e.g., without manual setup) with the other computing devices the source computing device 102 has been coupled, or otherwise connected to.

The capability negotiation module 220, which may be embodied as hardware, firmware, software, virtualized hardware, emulated architecture, and/or a combination thereof as discussed above, is configured to manage a capability negotiation between the source computing device 102 and the destination computing device 106 (see, e.g., the communication flow 400 of FIG. 4 described below). In some embodiments, the source computing device 102 and the destination computing device 106 may exchange information regarding various standards, transmission protocols, cast session parameters, etc., prior to casting the digital media content from the source computing device 102 to the destination computing device 106. To do so, the illustrative capability negotiation module 220 includes a transmission protocol management module 222 and a cast session parameters determination module 224.

It should be appreciated that each of the transmission protocol management module 222 and the cast session parameters determination module 224 of the capability negotiation module 220 may be separately embodied as hardware, firmware, software, virtualized hardware, emulated architecture, and/or a combination thereof. For example, the transmission protocol management module 222 may be embodied as a hardware component, while the cast session parameters determination module 224 is embodied as a virtualized hardware component or as some other combination of hardware, firmware, software, virtualized hardware, emulated architecture, and/or a combination thereof.

The transmission protocol management module 222 is configured to manage the protocol methods supported by the source computing device 102, such as by the transmission protocol used to cast the digital media content to the destination computing device 106. To do so, the transmission protocol management module 222 is configured to generate a message for transmission to the destination computing device 106 that includes a request for supported protocol methods of the destination computing device 106. The message additionally includes identifying information (e.g., software version information, unique manufacturer identification, etc.) of the source computing device 102 usable by the destination computing device 106 to optimize functions performed thereon based on the identifying information of the source computing device 102. The transmission protocol management module 222 is further configured to receive a message from the destination computing device 106 that includes the supported protocol methods, as well as identifying information (e.g., software version information, unique manufacturer identification, etc.) of the destination computing device 106 that is usable by the source computing device 102 to optimize functions performed thereon based on the identifying information of the destination computing device 106.

The cast session parameters determination module 224 is configured to determine one or more cast session parameters from a set of cast session capabilities (i.e., supported processing and/or rendering capabilities) for a cast session in which the source computing device 102 is to cast digital media content to the destination computing device 106. To determine the cast session parameters, the cast session parameters determination module 224 is configured to generate a request message for transmission to the destination computing device 106 that includes a request for cast session capabilities of the destination computing device 106, such as supported audio codecs to decode audio of received digital media content, supported video codecs to decode video of the received digital media content, supported rendering formats (e.g., standard, 3-dimensional (3D), etc.), supported display modes including characteristics of the digital media content (e.g., bit depth, color space, resolution, height, width, refresh rate, etc.) to render, and/or other cast session capabilities related to processing and/or rendering the digital media content.

The cast session parameters determination module 224 is further configured to receive, in response to the request message, and interpret a response message from the destination computing device 106 that includes the set of cast session capabilities of the destination computing device 106. Further, the cast session parameters determination module 224 is configured to determine the cast session parameters based on the identifying information of the destination computing device 106, as well as the set of cast session capabilities. It should be appreciated that the set of cast session capabilities of the destination computing device 106 may not include all of the cast session capabilities of the destination computing device 106, but rather a subset of all the supported cast session capabilities based on identifying information of the source computing device. The cast session parameters determined by the cast session parameters determination module 224 may include data related to processing and/or display of the cast digital media content, such as an audio codec, a video codec, a rendering format, a display mode, etc., based on the cast session capabilities received from the destination computing device 106.

For example, in an embodiment using real-time streaming protocol (RTSP), the transmission protocol management module 222 may be configured to manage supported methods of the RTSP supported by the source computing device 102, as well as by the destination computing device 106. In furtherance of the example, the transmission protocol management module 222 may be configured to generate an RTSP request message (e.g., using the RTSP message structure) to be transmitted to the destination computing device 106 that includes a request for a set of RTSP methods that are supported by the destination computing device 106. Further, the transmission protocol management module 222 may be configured to receive an RTSP request message from the destination computing device 106 and generate an RTSP response message to be transmitted to the destination computing device 106 that includes supported RTSP methods of the source computing device 102. In such embodiments, information related to the supported RTSP methods may be stored in the transmission protocol data 204.

Additionally or alternatively, the cast session parameters determination module 224 may be configured to, subsequent to the supported RTSP method exchange, generate a capability request message to be transmitted to the destination computing device 106 that includes a list of capabilities of the source computing device 102 that are of interest to the destination computing device 106. It should be appreciated that the list of capabilities of the source computing device 102 only includes those capabilities that are supported by the destination computing device 106, as determined from the identifying information of the destination computing device 106.

In some embodiments, the source computing device 102 may include information mapped to cast session parameters to information contained in the identifying information of the computing device, such as version numbers, to which the digital media content is to be casted. In such embodiments, the cast session parameters determination module 224 may be configured to determine the cast session parameters based on the identifying information of the destination computing device 106 and the cast session parameters mapped to the corresponding identifying information.

The digital media content casting module 230, which may be embodied as hardware, firmware, software, virtualized hardware, emulated architecture, and/or a combination thereof as discussed above, is configured to cast or otherwise transmit (e.g., stream, mirror, etc.) digital media content as a function of the cast session parameters, such as may be determined by the cast session parameters determination module 224. In some embodiments, the digital media content to be casted may be stored in the digital media content data 208.

Figure 3:
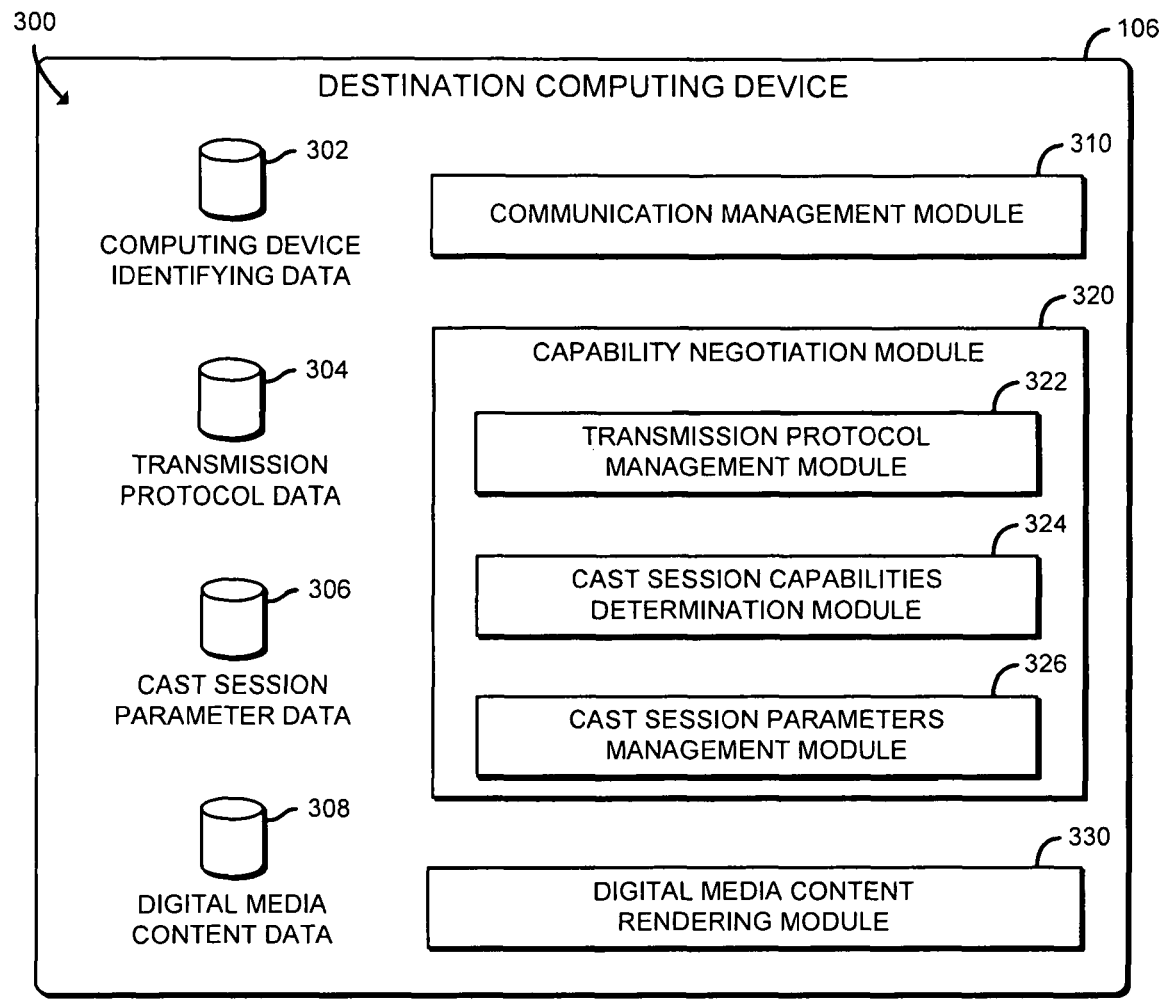
FIG. 3 is a simplified block diagram of at least one embodiment of an environment of the destination computing device of the system of FIG. 1.

Referring now to FIG. 3, in an illustrative embodiment, the destination computing device 106 establishes an environment 300 during operation. The illustrative environment 300 includes a communication management module 310, a capability negotiation module 320, and a digital media content rendering module 330. The various modules of the environment 300 may be embodied as hardware, firmware, software, or a combination thereof. As such, in some embodiments, one or more of the modules of the environment 300 may be embodied as circuitry or collection of electrical devices (e.g., a communication management circuit 310, a capability negotiation circuit 320, a digital media content rendering circuit 330, etc.).

It should be appreciated that, in such embodiments, one or more of the communication management circuit 310, the capability negotiation circuit 320, and the digital media content rendering circuit 330 may form a portion of one or more of the processor 130, the I/O subsystem 132, and/or other components of the destination computing device 106. Additionally, in some embodiments, one or more of the illustrative modules may form a portion of another module and/or one or more of the illustrative modules may be independent of one another. Further, in some embodiments, one or more of the modules of the environment 200 may be embodied as virtualized hardware components or emulated architecture, which may be established and maintained by the processor 130 or other components of the destination computing device 106.

In the illustrative environment 300, the destination computing device 106 includes computing device identifying data 302, transmission protocol data 304, cast session parameter data 306, and digital media content data 308, each of which may be accessed by the various modules and/or sub-modules of the destination computing device 106. It should be appreciated that the destination computing device 106 may include additional and/or alternative components, sub-components, modules, sub-modules, and/or devices commonly found in a computing device, which are not illustrated in FIG. 3 for clarity of the description.

The communication management module 310, which may be embodied as hardware, firmware, software, virtualized hardware, emulated architecture, and/or a combination thereof as discussed above, is configured to facilitate inbound and outbound wired and/or wireless communications (e.g., network traffic, network packets, network flows, etc.) to and from the destination computing device 106, similar to the communication management module 210 of the illustrative source computing device 102 of FIG. 2. To do so, the communication management module 310 is configured to receive and process network packets from other computing devices (e.g., the source computing device 102 and/or other computing device(s) communicatively coupled to the destination computing device 106). Additionally, the communication management module 310 is configured to prepare and transmit network packets to other computing devices (e.g., the source computing device 102 and/or other computing device(s) communicatively coupled to the destination computing device 106).

The communication management module 310 is further configured to establish a communication channel at the network layer (i.e., the IP layer) with the computing devices with which the destination computing device 106 is communicatively coupled. Accordingly, in some embodiments, at least a portion of the functionality of the communication management module 310 may be performed by the communication circuitry 138 of the destination computing device 106 (e.g., a NIC of the communication circuitry 138). In some embodiments, data used to couple to the other computing devices (e.g., Wi-Fi Direct pairing credentials, an identifier of the source computing device 102, etc.) may be stored in the computing device identifying data 302, which may be retrieved and utilized for future coupling attempts with the other computing devices that have been previously coupled to the destination computing device 106.

The capability negotiation module 320, which may be embodied as hardware, firmware, software, virtualized hardware, emulated architecture, and/or a combination thereof as discussed above, is configured to manage a capability negotiation between the destination computing device 106 and the source computing device 102, similar to the illustrative capability negotiation module 220 of the source computing device 102. For example, in some embodiments, the destination computing device 106 and the source computing device 102 may exchange information regarding various standards, transmission protocols, cast session parameters, etc., prior to receiving the digital media content from the source computing device 102. To do so, the illustrative capability negotiation module 320 includes a transmission protocol management module 322, a cast session capabilities determination module 324, and a cast session parameters management module 326.

It should be appreciated that each of the transmission protocol management module 322, the cast session capabilities determination module 324, and the cast session parameters management module 326 of the capability negotiation module 320 may be separately embodied as hardware, firmware, software, virtualized hardware, emulated architecture, and/or a combination thereof. For example, the transmission protocol management module 322 may be embodied as a hardware component, while the cast session capabilities determination module 324 and/or the cast session parameters management module 326 is embodied as a virtualized hardware component or as some other combination of hardware, firmware, software, virtualized hardware, emulated architecture, and/or a combination thereof.

The transmission protocol management module 322 is configured to manage the protocol methods supported by a transmission protocol used by the destination computing device 106 when receiving casted digital media content from the source computing device 102. To do so, the transmission protocol management module 322 is configured to receive a message from the source computing device 102 that includes a request for the supported protocol methods of the destination computing device 106. The message additionally includes identifying information (e.g., software version information, unique manufacturer identification, etc.) of the source computing device 102 usable by the destination computing device 106 to optimize functions performed thereon based on the identifying information of the source computing device 102. The transmission protocol management module 322 is further configured to generate a message for transmission to the source computing device 102 that includes the requested supported protocol methods, as well as identifying information (e.g., software version information, unique manufacturer identification, etc.) of the destination computing device 106 that is usable by the source computing device 102 to optimize functions performed thereon based on the identifying information of the destination computing device 106.

The cast session capabilities determination module 324 is configured to interpret a request message received from the source computing device 102 that includes a request for cast session capabilities of the destination computing device 106. As described previously, the cast session capabilities includes a list of supported cast session parameters, such as supported audio codecs, supported video codecs, supported rendering formats, supported display modes, etc., compatible with the source computing device 102 (i.e., based on identifying information of the source computing device 102 received previously). In response to having received the request, the cast session capabilities determination module 324 is further configured to generate and transmit a message to the source computing device 102 that includes the set of cast session capabilities of the destination computing device 106 based on the identifying information of the source computing device 102.

The cast session parameters management module 326 is configured to receive a message from the source computing device 102 that includes the cast session parameters for a cast session in which the source computing device 102 is to cast digital media content to the destination computing device 106. Accordingly, the cast session parameters may be used by the digital media content rendering module 330 to decode and/or render the received digital media content. It should be appreciate that, as described previously, the cast session parameters received from the source computing device 102 for the cast session may be determined by the source computing device 102 based on the identifying information of the destination computing device 106.

For example, as similarly described previously with transmission protocol management module 222 of FIG. 2, in an embodiment using RTSP, the transmission protocol management module 322 may configured to manage supported methods of the RTSP supported by the destination computing device 106, as well as by the source computing device 102. In furtherance of the example, the transmission protocol management module 322 may be configured to receive an RTSP request message from the destination computing device 106 that includes a request for a set of RTSP methods that are supported by the destination computing device 106. The transmission protocol management module 322 may be configured to, in response, generate an RTSP response message to be transmitted to the source computing device 102 that includes supported RTSP methods of the destination computing device 106. Further, the transmission protocol management module 322 may be configured to generate an RTSP request message to be transmitted to the source computing device 102 that includes a request for a set of RTSP methods that are supported by the source computing device 102 and receive an RTSP response message from the source computing device 102 that includes supported RTSP methods of the source computing device 102. In such embodiments, information related to the supported RTSP methods may be stored in the transmission protocol data 304.

As described previously, the cast session capabilities determination module 324 may be configured to, subsequent to the supported RTSP method exchange, receive a capability request message from the source computing device 102 requesting a list of cast session capabilities of the destination computing device 106 that are of interest to the source computing device 102 for the purposes of processing and rendering the casted digital media content. Further, the cast session capabilities determination module 324 may be configured to generate a response message to transmit to the source computing device 102 that includes a set of cast session capabilities of the destination computing device 106 corresponding to the list of capabilities of interest received from the source computing device 102.

Additionally, the cast session parameters management module 326 may be configured to receive and interpret a response message from the source computing device 102 that includes the cast session parameters determined by the source computing device 102. As described previously, the set of cast session capabilities may include data related to processing and/or display of the cast digital media content, such as supported audio codec(s), supported video codec(s), supported rendering format(s), supported display mode(s), etc. In some embodiments, the cast session parameters may be stored in the cast session parameter data 306.

The digital media content rendering module 330, which may be embodied as hardware, firmware, software, virtualized hardware, emulated architecture, and/or a combination thereof as discussed above, is configured to decode and render digital media content as a function of the cast session parameters, such as may be determined by the cast session parameters management module 326. Accordingly, the rendered digital media content may then be transmitted to an output device of the destination computing device 106, such as a display, a speaker, etc. In some embodiments, the digital media content casted from the source computing device 102 may be temporarily stored in the digital media content data 308.

Figure 4:
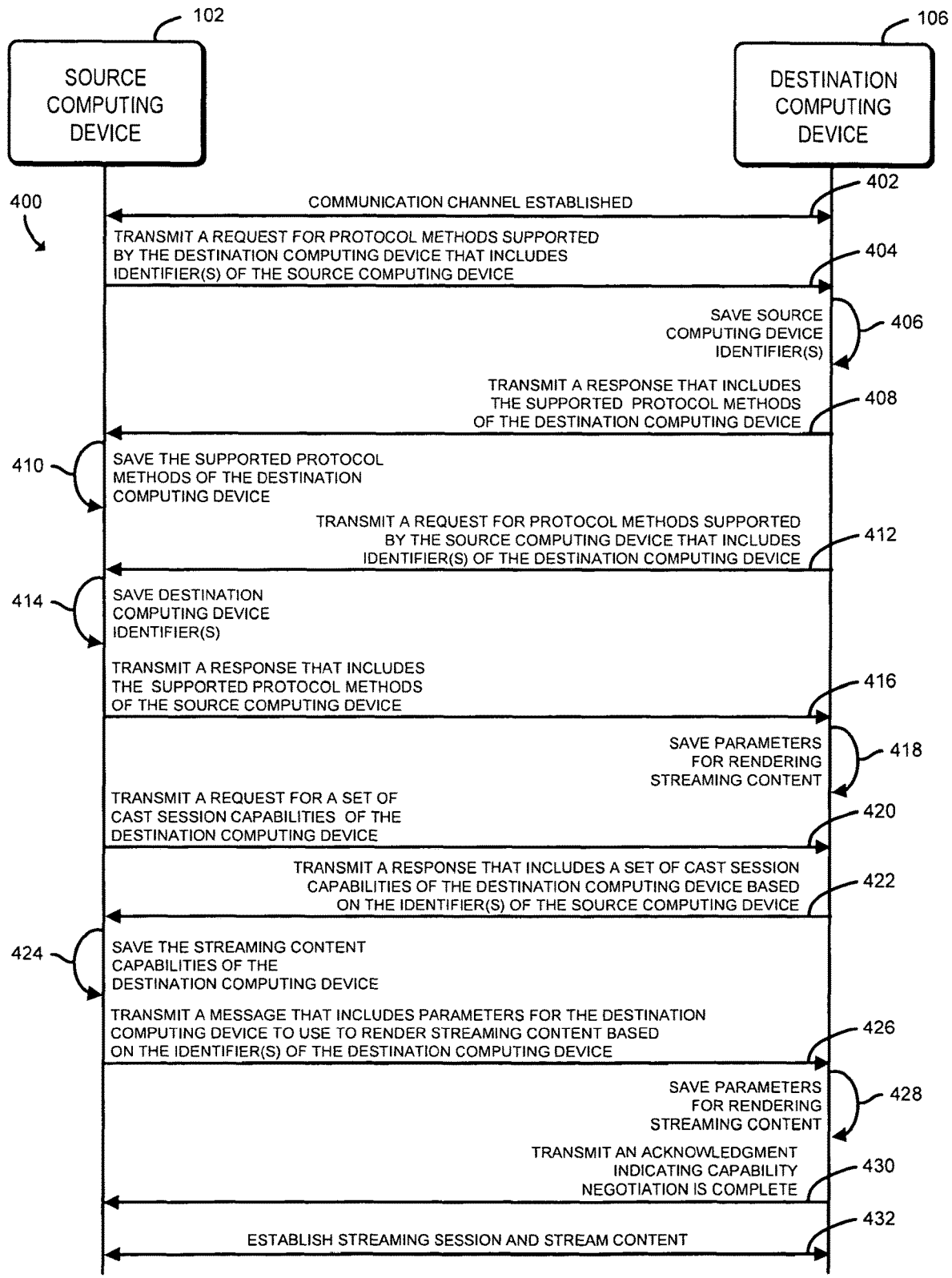
FIG. 4 is a simplified communication flow diagram of at least one embodiment of a capability negotiation flow that may be executed between the source computing device of FIGS. 1 and 2, and the destination computing device of FIGS. 1 and 3.

Referring now to FIG. 4, an embodiment of a communication flow 400 for capability negotiation includes the source computing device 102 and the destination computing device 106 communicatively coupled over a communication channel (e.g., the communication channel 104 of FIG. 1). The illustrative communication flow 400 includes a number of data flows, some of which may be executed separately or together, depending on the embodiment. In data flow 402, the communication channel (e.g., a TCP connection) is established between the source computing device 102 and the destination computing device 106, as described previously, at the network layer of the OSI model.

In data flow 404, the source computing device 102 transmits a message to the destination computing device 106 requesting protocol methods that are supported by the destination computing device 106. The request message additionally includes one or more identifying characteristics of the source computing device 102, such as a version number of a standard to be used by the source computing device 102 and the destination computing device 106, a unique identifier of a manufacturer of at least one hardware component of the source computing device 102, a version associated with the manufacturer, and/or one or more software version indicators (e.g., an application version indicator, an operating system version indicator, etc.). In data flow 406, the destination computing device 106 saves the identifying characteristic(s) of the source computing device 102 received from the source computing device 102 in data flow 404.

In data flow 408, the destination computing device 106 transmits a response message to the source computing device 102 that includes the supported protocol methods of the destination computing device 106. It should be appreciated that, in some embodiments, only a subset of the supported protocol methods of the destination computing device 106 may be transmitted in the response message. In such embodiments, the subset of the supported protocol methods of the destination computing device 106 may be determined based on the identifying characteristic(s) of the source computing device 102. In data flow 410, the source computing device 102 saves the supported protocol methods of the destination computing device 106 received in the response message at data flow 408.

In data flow 412, the destination computing device 106 transmits a message to the source computing device 102 that includes a request for protocol methods supported by the source computing device 102. The request message additionally includes one or more identifying characteristics of the destination computing device 106. In data flow 414, the source computing device 102 saves the identifying characteristic(s) received from the destination computing device 106 in data flow 412. In data flow 416, the source computing device 102 transmits a response message to the destination computing device 106 that includes the supported protocol methods of the source computing device 102. It should be appreciated that, in some embodiments, the supported protocol methods of the source computing device 102 transmitted to the destination computing device 106 may be a subset of supported protocol methods of the source computing device 102. In such embodiments, the subset of the supported protocol methods of the source computing device 102 may be determined based on the identifying characteristic(s) of the destination computing device 106. In data flow 418, the destination computing device 106 saves the supported protocol methods of the source computing device 102 received in the response message at data flow 416.

In data flow 420, the source computing device 102 transmits a message to the destination computing device 106 that includes a request for a set of capabilities for a cast session (i.e., cast session capabilities). As described previously, the cast session capabilities include any processing and/or rendering capabilities supported by the destination computing device 106, such as supported audio codecs, supported video codecs, supported rendering formats, supported display modes, etc. In data flow 422, the destination computing device 106 transmits a response to the source computing device 102 that includes a set of cast session capabilities of the destination computing device 106. It should be appreciated that, in some embodiments, the set of cast session capabilities of the destination computing device 106 transmitted to the source computing device 102 may be a subset of cast session capabilities supported by the destination computing device 106. In such embodiments, the subset of the cast session capabilities of the destination computing device 106 may be determined based on the identifying characteristic(s) of the source computing device 102.

In data flow 424, the source computing device 102 saves the cast session capabilities received from the destination computing device 106 in data flow 420. In data flow 426, the source computing device 102 transmits a message to the destination computing device 106 that includes cast session parameters usable by the destination computing device 106 to process and render digital media content casted from the source computing device 102 to the destination computing device 106. As described previously, the cast session parameters may be determined by the source computing device 102 based on identifying information of the destination computing device 106. As also described previously, the cast session parameters may include data related to processing and/or display of the cast digital media content, such as an audio codec, a video codec, a rendering format, a display mode, etc.

In data flow 428, the destination computing device 106 saves the cast session parameters for processing and/or rendering digital media content casted from the source computing device 102. In data flow 430, the destination computing device 106 transmits an acknowledgment message to the source computing device 102 indicating completion of the compatibility negotiation (i.e., the destination computing device 106 received the cast session parameters). In data flow 432, the source computing device 102 and the destination computing device 106 establish a casting session and the source computing device 102 casts digital media content to the destination computing device 106 for processing and rendering at the destination computing device 106.

It should be appreciate that, in some embodiments, certain data flows of the communication flow 400 may be skipped as a result of the exchange of identifying characteristics of the source computing device 102 and the destination computing device 106. For example, in such an embodiment wherein a manufacturer of the source computing device 102 only supports a particular video and/or audio codec, the capability negotiation associated with the codecs may be skipped, thereby reducing overall processing by eliminating processing associated with such a capability negotiation.

It should be further appreciated that, in some embodiments, the source computing device 102 and/or the destination computing device 106 may utilize the identifying characteristics to perform additional functions without a renegotiation between the source computing device 102 and the destination computing device 106. For example, in some embodiments, the characteristics of the digital media content, such as a bit stream of the digital media content being casted may be dynamically changed during casting without breaking compatibility, so long as the change is compatible with the set of cast session capabilities of the destination computing device 106.

Figure 5:
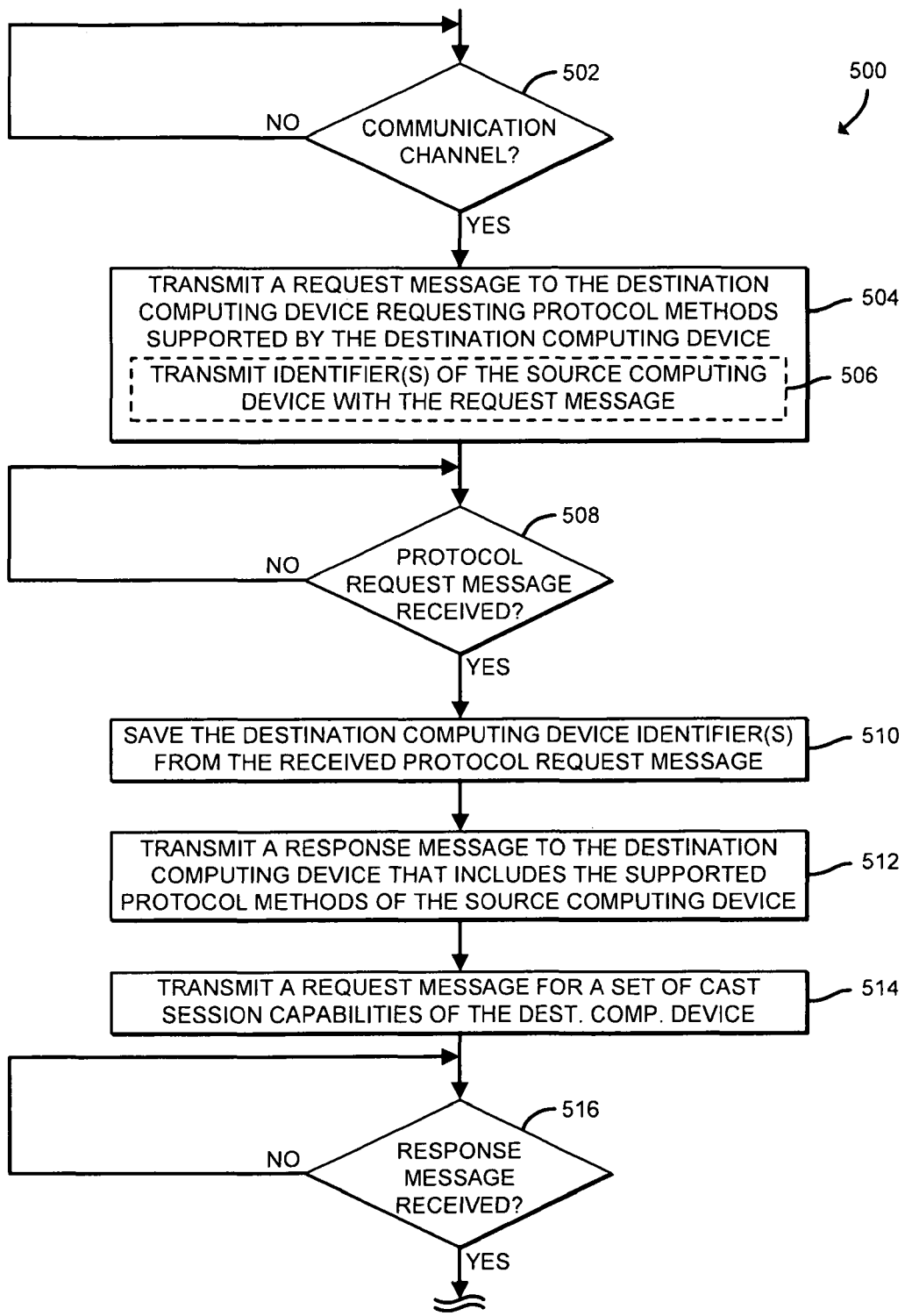
FIGS. 5 and 6 is a simplified flow diagram of at least one embodiment for detecting capabilities of the destination computing device of FIGS. 1 and 3 that may be executed by the source computing device of FIGS. 1 and 2.
Figure 6:
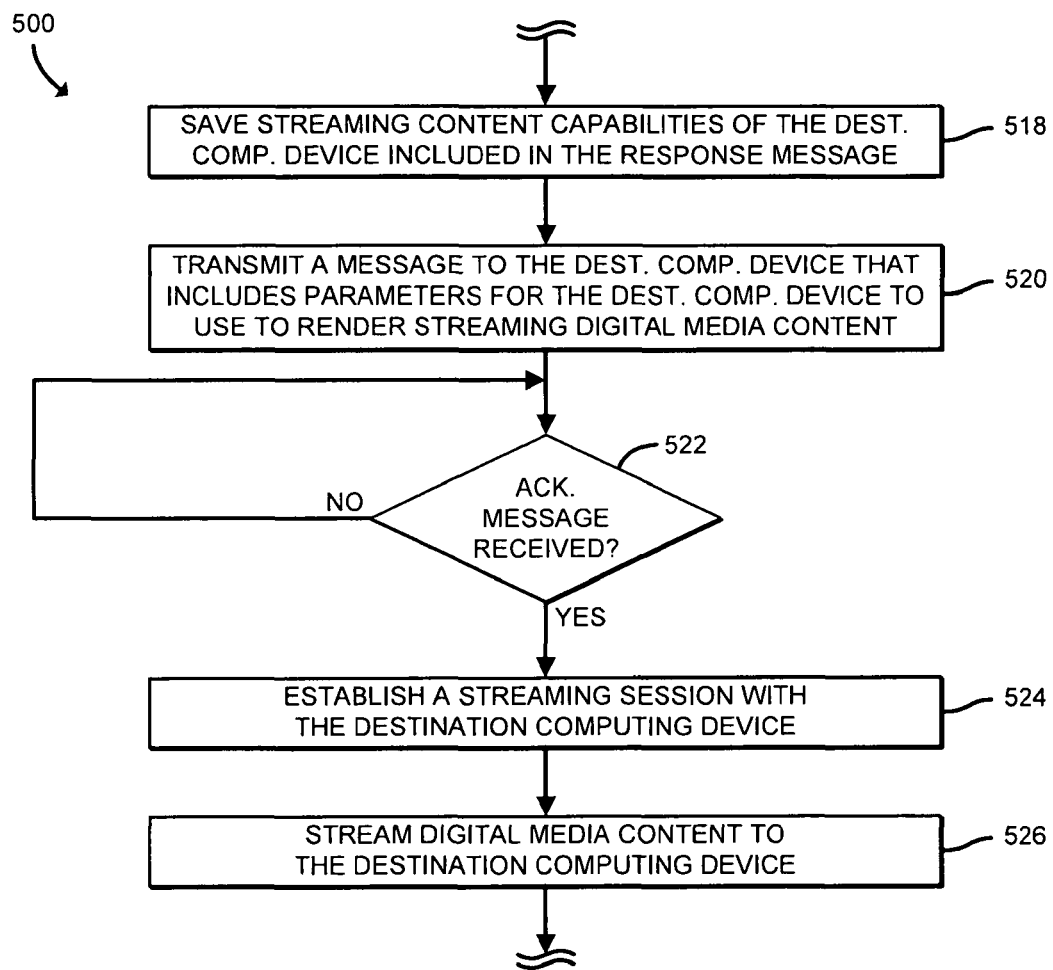

Referring now to FIGS. 5 and 6, in use, the source computing device 102 may execute a method 500 for capability detection of a destination computing device (e.g., the destination computing device 106 of FIG. 1). It should be appreciated that at least a portion of method 500 may be embodied as various instructions stored on a computer-readable media, which may be executed by the processor 110, the communication circuitry 118, and/or other components of the source computing device 102 to cause the source computing device 102 to perform the method 500. The computer-readable media may be embodied as any type of media capable of being read by the source computing device 102 including, but not limited to, the memory 114, the data storage device 116, a local memory of a NIC (not shown) of the communication circuitry 118, other memory or data storage devices of the source computing device 102, portable media readable by a peripheral device of the source computing device 102, and/or other media.

The method 500 begins in block 502, in which the source computing device 102 determines whether a communication channel (e.g., the communication channel 104 of FIG. 1) has been established between the source computing device 102 and the destination computing device 106. If so, the method 500 advances to block 504, wherein the source computing device 102 transmits a request message to the destination computing device requesting the protocol methods that are supported by the destination computing device 106. In some embodiments, in block 506, the source computing device 102 may transmit one or more identifiers of the source computing device 102 with the request message.

In block 508, the source computing device 102 determines whether a protocol request message has been received from the destination computing device 106. If so, the method 500 advances to block 510, in which the source computing device 102 saves the identifiers of the destination computing device 106 that were received with the protocol request message in block 508. In block 512, the source computing device 102 transmits a response message to the destination computing device 106 that includes the supported protocol methods of the source computing device 102. In block 514, the source computing device 102 transmits a request message to the destination computing device 106 for a set of cast session capabilities of the destination computing device 106.

In block 516, the source computing device 102 determines whether a response message was received from the destination computing device 106. If so, the method 500 advances to block 518 (see FIG. 6), wherein the source computing device 102 saves the streaming content capabilities of the destination computing device 106 that were included in the response message received in block 516. In block 520, the source computing device 102 transmits a message to the destination computing device that includes one or more cast session parameters usable by the destination computing device 106 to render streaming digital media content transmitted by the source computing device 102.

In block 522, the source computing device 102 determines whether an acknowledgment message was received from the destination computing device 106. If so, the method 500 advances to block 514, in which the source computing device 102 establishes a streaming session with the destination computing device. In block 526, the source computing device 102 casts digital media content to the destination computing device 106.

Figure 7:
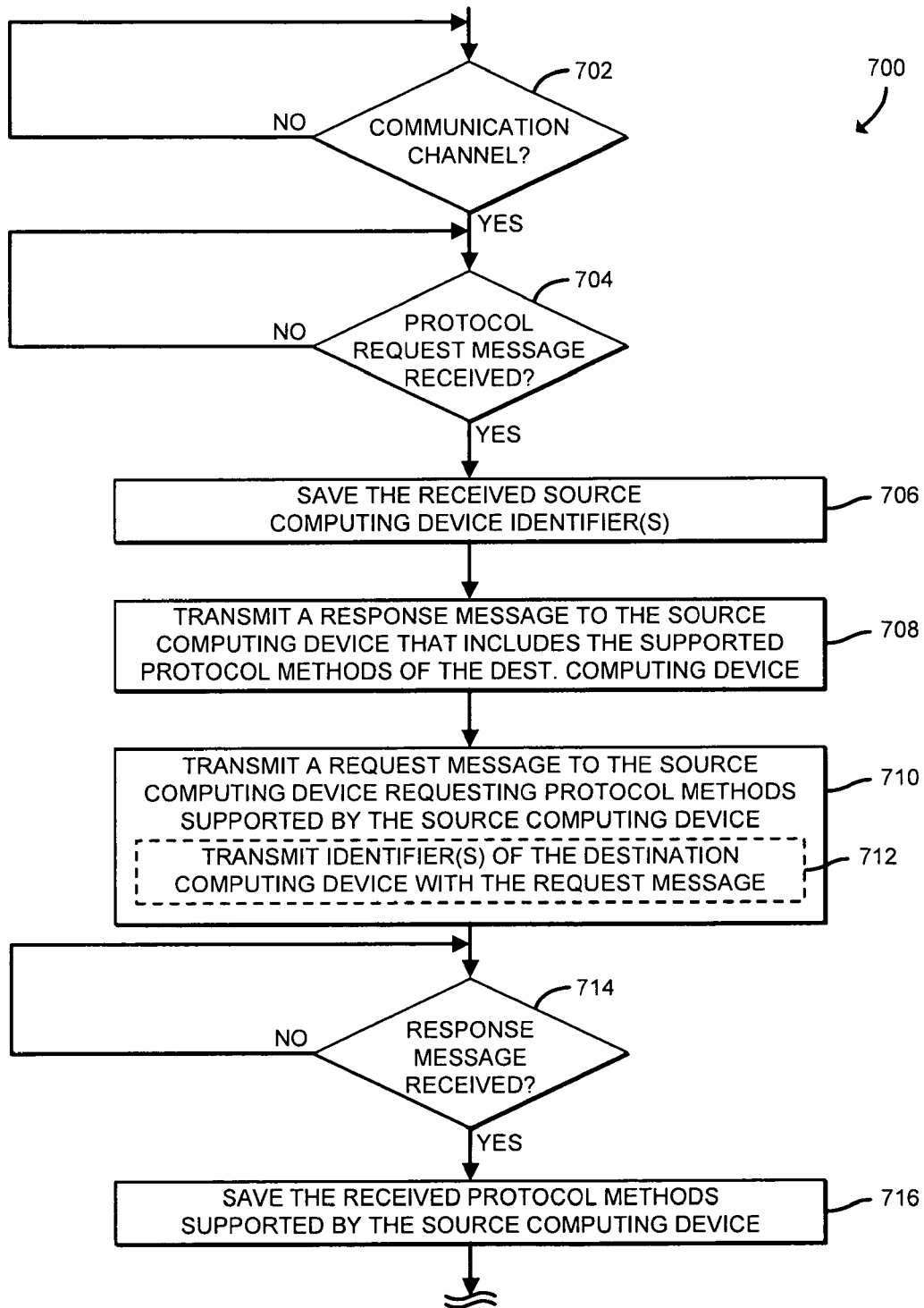
FIGS. 7 and 8 is a simplified flow diagram of at least one embodiment for the detecting capabilities of the source computing device of FIGS. 1 and 2 that may be executed by the destination computing device of FIGS. 1 and 3.
Figure 8:
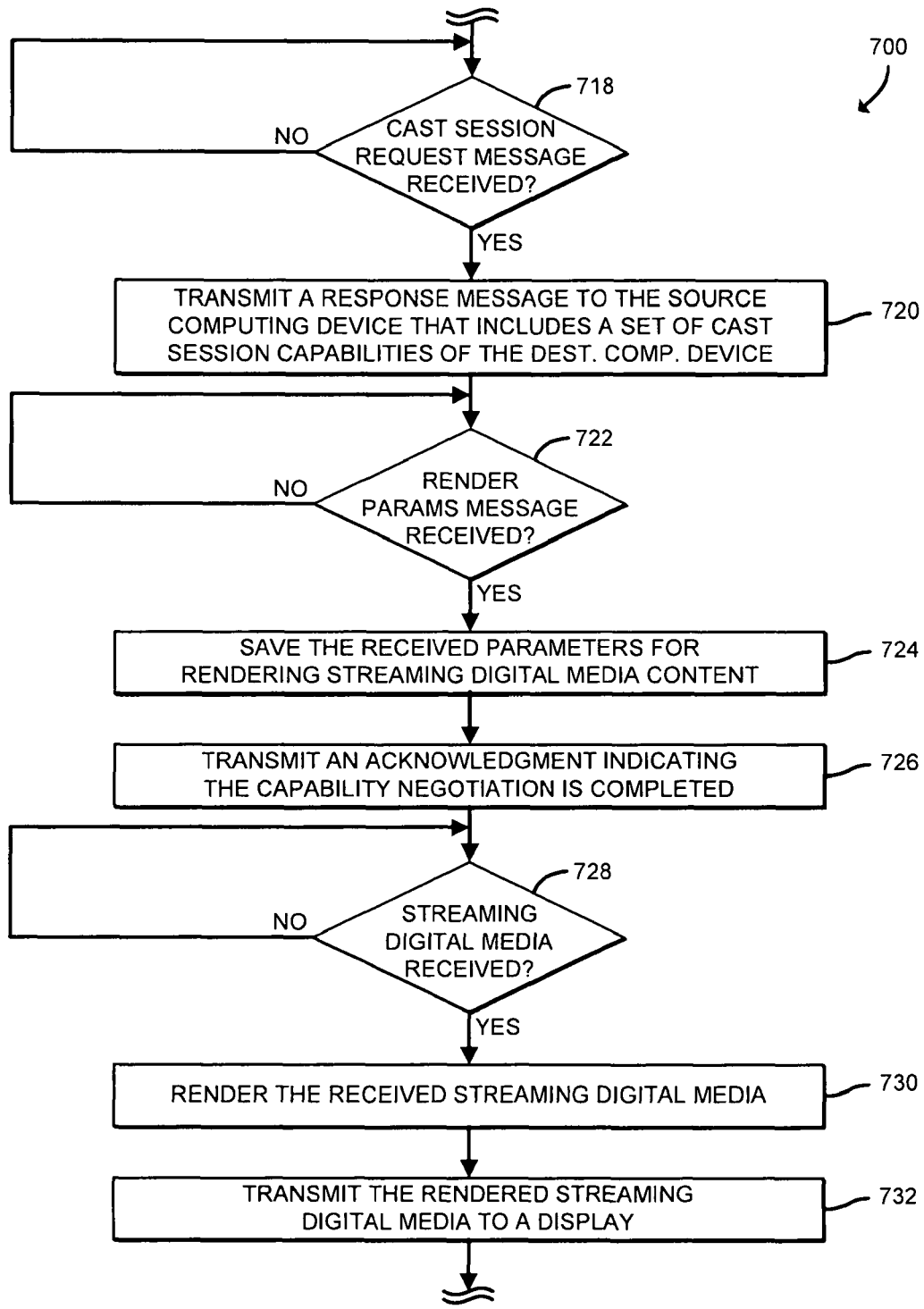

Referring now to FIGS. 7 and 8, in use, the destination computing device 106 may execute a method 700 for capability detection of a source computing device (e.g., the source computing device 102 of FIG. 1). It should be appreciated that at least a portion of method 700 may be embodied as various instructions stored on a computer-readable media, which may be executed by the processor 130, the communication circuitry 138, and/or other components of the destination computing device 106 to cause the destination computing device 106 to perform the method 700. The computer-readable media may be embodied as any type of media capable of being read by the destination computing device 106 including, but not limited to, the memory 134, the data storage device 136, a local memory of a NIC (not shown) of the communication circuitry 138, other memory or data storage devices of the destination computing device 106, portable media readable by a peripheral device of the destination computing device 106, and/or other media.

The method 700 begins in block 702, in which the destination computing device 106 determines whether a communication channel (e.g., the communication channel 104 of FIG. 1) has been established between the destination computing device 106 and the source computing device 102. In block 704, the destination computing device 106 determinates whether a protocol request message was received from the source computing device 102. If so, the method 700 advances to block 706, in which the destination computing device 106 saves one or more identifiers of the source computing device 102 from the protocol request message received in block 704. In block 708, the destination computing device 106 transmits a response message to the source computing device 102 that includes the supported protocol method of the destination computing device 106.

In block 710, the destination computing device 106 transmits a request message to the source computing device requesting protocol methods supported by the source computing device 102. In some embodiments, in block 712, the destination computing device 106 transmits one or more identifiers of the destination computing device 106 with the request message transmitted in block 710. In block 712, the destination computing device 106 determines whether a response message was received from the source computing device 102. If so, the method 700 advances to block 716, wherein the destination computing device 106 saves protocol methods supported by the source computing device 102 from the response message that was received in block 714.

In block 718 (see FIG. 8), the destination computing device 106 determines whether a cast session request message was received from the source computing device 102. If so, the method 700 advances to block 720, wherein the destination computing device 106 transmits a response message to the source computing device that includes a set of cast session capabilities of the destination computing device 106. In block 722, the destination computing device 106 determines whether a rendering parameters message was received from the source computing device 102. If so, the method 700 advances to block 724, in which the destination computing device 106 saves the received parameters for rendering streaming digital media content received from the source computing device 102.

In block 726, the destination computing device 106 transmits an acknowledgment indicating the capability negotiation is complete. In block 728, the destination computing device 106 determines whether streaming digital media (e.g., a network packet that includes at least a portion of a frame of the streaming digital media) was received from the source computing device 102. If so, the method 700 advances to block 730, in which the destination computing device 106 renders the received streaming digital media based on the received parameters saved in block 724. In block 732, the destination computing device 106 transmits the rendered streaming digital media to a display of the destination computing device 106.

EXAMPLES

Illustrative examples of the technologies disclosed herein are provided below. An embodiment of the technologies may include any one or more, and any combination of, the examples described below.

Example 1 includes a source computing device for casting digital media content, the source computing device comprising a capability negotiation module to (i) transmit a set of identifiers of the source computing device to a destination computing device, wherein the set of identifiers of the source computing device includes a version associated with the source computing device and a unique identifier of the source computing device, (ii) receive a set of identifiers of the destination computing device from the destination computing device, wherein the set of identifiers of the destination computing device includes a version associated with the destination computing device and a unique identifier of the destination computing device, and (iii) determine a subset of casting session parameters from a set of casting session parameters based on the one or more capabilities of the destination computing device, wherein the subset of casting session parameters are usable by the destination computing device to establish a casting session and stream content in accordance with the subset of casting session parameters; and a digital media content module to transmit the subset of casting session parameters to the destination computing device.

Example 2 includes the subject matter of Example 1, and wherein to transmit the set of identifiers of the source computing device to the destination computing device comprises to transmit a request for one or more protocol methods supported by the destination computing device, wherein the request for the one or more protocol methods supported by the destination computing device includes the set of identifiers of the source computing device.

Example 3 includes the subject matter of any of Examples 1 and 2, and wherein to receive the set of identifiers of the destination computing device from the destination computing device comprises to receive, subsequent to having transmitted the request for one or more protocol methods supported by the destination computing device, a response that includes the one or more protocol methods supported by the destination computing device and the set of identifiers of the destination computing device.

Example 4 includes the subject matter of any of Examples 1-3, and wherein to determine the subset of casting session parameters is further based on the one or more protocol methods supported by the destination computing device.

Example 5 includes the subject matter of any of Examples 1-4, and wherein the plurality of instructions further cause the source computing device to receive, prior to having transmitted the set of identifiers of the source computing device to the destination computing device, an internet protocol (IP) address of the destination computing device; and establish a communication channel between the source computing device and the destination computing device using an IP address of the source computing device and the IP address of the destination computing device, wherein to transmit the set of identifiers of the source computing device to the destination computing device comprises to transmit the set of identifiers of the source computing device via the communication channel.

Example 6 includes the subject matter of any of Examples 1-5, and wherein the plurality of instructions further cause the source computing device to establish, subsequent to having transmitted the subset of casting session parameters to the destination computing device, the casting session between the source computing device and the destination computing device based on the one or more capabilities of the destination computing device; and cast at least a portion of digital media content stored at the source computing device to the destination computing device during the casting session based on the subset of casting session parameters to the destination computing device.

Example 7 includes the subject matter of any of Examples 1-6, and wherein the set of identifiers of the source computing device includes a unique identifier of a manufacturer of the source computing device, a version of an operating system executing on the source computing device, a version of a standard employable by the source computing device, and a version of the manufacturer of the source computing device.

Example 8 includes the subject matter of any of Examples 1-7, and wherein the set of identifiers of the destination computing device includes a unique identifier of a manufacturer of the destination computing device, a version of an operating system executing on the destination computing device, a version of a standard employable by the destination computing device, and a version of the manufacturer of the destination computing device.

Example 9 includes a method for casting digital media content, the method comprising transmitting, by a source computing device, a set of identifiers of the source computing device to a destination computing device, wherein the set of identifiers of the source computing device includes a version associated with the source computing device and a unique identifier of the source computing device; receiving, by the source computing device, a set of identifiers of the destination computing device from the destination computing device, wherein the set of identifiers of the destination computing device includes a version associated with the destination computing device and a unique identifier of the destination computing device; determining, by the source computing device, a subset of casting session parameters from a set of casting session parameters based on the one or more capabilities of the destination computing device, wherein the subset of casting session parameters are usable by the destination computing device to establish a casting session and cast content in accordance with the subset of casting session parameters; and transmitting, by the source computing device, the subset of casting session parameters to the destination computing device.

Example 10 includes the subject matter of Example 9, and wherein transmitting the set of identifiers of the source computing device to the destination computing device comprises transmitting a request for one or more protocol methods supported by the destination computing device, wherein the request for the one or more protocol methods supported by the destination computing device includes the set of identifiers of the source computing device.

Example 11 includes the subject matter of any of Examples 9 and 10, and wherein receiving the set of identifiers of the destination computing device from the destination computing device comprises receiving, subsequent to transmitting the request for one or more protocol methods supported by the destination computing device, a response that includes the one or more protocol methods supported by the destination computing device and the set of identifiers of the destination computing device.

Example 12 includes the subject matter of any of Examples 9-11, and wherein determining the subset of casting session parameters is further based on the one or more protocol methods supported by the destination computing device.

Example 13 includes the subject matter of any of Examples 9-12, and further including receiving, by the source computing device and prior to transmitting the set of identifiers of the source computing device to the destination computing device, an internet protocol (IP) address of the destination computing device; and establishing, by the source computing device, a communication channel between the source computing device and the destination computing device using an IP address of the source computing device and the IP address of the destination computing device, wherein transmitting the set of identifiers of the source computing device to the destination computing device comprises transmitting the set of identifiers of the source computing device via the communication channel.

Example 14 includes the subject matter of any of Examples 9-13, and further including establishing, by the source computing device and subsequent to transmitting the subset of casting session parameters to the destination computing device, the casting session between the source computing device and the destination computing device based on the one or more capabilities of the destination computing device; and casting, by the source computing device, at least a portion of digital media content stored on the source computing device to the destination computing device during the casting session based on the subset of casting session parameters to the destination computing device.

Example 15 includes the subject matter of any of Examples 9-14, and wherein transmitting the set of identifiers of the source computing device comprises transmitting at least one of a unique identifier of a manufacturer of the source computing device, a version of an operating system executing on the source computing device, a version of a standard employable by the source computing device, and a version of the manufacturer of the source computing device.

Example 16 includes the subject matter of any of Examples 9-15, and wherein receiving the set of identifiers of the destination computing device comprises receiving at least one of a unique identifier of a manufacturer of the destination computing device, a version of an operating system executing on the destination computing device, a version of a standard employable by the destination computing device, and a version of the manufacturer of the destination computing device.

Example 17 includes a source computing device comprising a processor; and a memory having stored therein a plurality of instructions that when executed by the processor cause the source computing device to perform the method of any of Examples 9-16.

Example 18 includes one or more machine readable storage media comprising a plurality of instructions stored thereon that in response to being executed result in a source computing device performing the method of any of Examples 9-16.

Example 19 includes a source computing device for casting digital media content, the source computing device comprising means for transmitting a set of identifiers of the source computing device to a destination computing device, wherein the set of identifiers of the source computing device includes a version associated with the source computing device and a unique identifier of the source computing device; means for receiving a set of identifiers of the destination computing device from the destination computing device, wherein the set of identifiers of the destination computing device includes a version associated with the destination computing device and a unique identifier of the destination computing device; means for determining a subset of casting session parameters from a set of casting session parameters based on the one or more capabilities of the destination computing device, wherein the subset of casting session parameters are usable by the destination computing device to establish a casting session and cast content in accordance with the subset of casting session parameters; and means for transmitting the subset of casting session parameters to the destination computing device.

Example 20 includes the subject matter of Example 19, and wherein the means for transmitting the set of identifiers of the source computing device to the destination computing device comprises means for transmitting a request for one or more protocol methods supported by the destination computing device, wherein the request for the one or more protocol methods supported by the destination computing device includes the set of identifiers of the source computing device.

Example 21 includes the subject matter of any of Examples 19 and 20, and wherein the means for receiving the set of identifiers of the destination computing device from the destination computing device comprises means for receiving, subsequent to transmitting the request for one or more protocol methods supported by the destination computing device, a response that includes the one or more protocol methods supported by the destination computing device and the set of identifiers of the destination computing device.

Example 22 includes the subject matter of any of Examples 19-21, and wherein the means for determining the subset of casting session parameters is further based on the one or more protocol methods supported by the destination computing device.

Example 23 includes the subject matter of any of Examples 19-22, and further including means for receiving, prior to transmitting the set of identifiers of the source computing device to the destination computing device, an internet protocol (IP) address of the destination computing device; and means for establishing a communication channel between the source computing device and the destination computing device using an IP address of the source computing device and the IP address of the destination computing device, wherein the means for transmitting the set of identifiers of the source computing device to the destination computing device comprises means for transmitting the set of identifiers of the source computing device via the communication channel.

Example 24 includes the subject matter of any of Examples 19-23, and further including means for establishing, subsequent to transmitting the subset of casting session parameters to the destination computing device, the casting session between the source computing device and the destination computing device based on the one or more capabilities of the destination computing device; and means for casting at least a portion of digital media content stored on the source computing device to the destination computing device during the casting session based on the subset of casting session parameters to the destination computing device.

Example 25 includes the subject matter of any of Examples 19-24, and wherein the means for transmitting the set of identifiers of the source computing device comprises means for transmitting at least one of a unique identifier of a manufacturer of the source computing device, a version of an operating system executing on the source computing device, a version of a standard employable by the source computing device, and a version of the manufacturer of the source computing device.

Example 26 includes the subject matter of any of Examples 19-25, and wherein the means for receiving the set of identifiers of the destination computing device comprises means for receiving at least one of a unique identifier of a manufacturer of the destination computing device, a version of an operating system executing on the destination computing device, a version of a standard employable by the destination computing device, and a version of the manufacturer of the destination computing device.

Example 27 includes a destination computing device for rendering casted digital media content, the destination computing device comprising a capability negotiation module to (i) receive a set of identifiers of a source computing device from the source computing device, wherein the set of identifiers of the source computing device includes a version associated with the source computing device and a unique identifier of the source computing device, (ii) transmit a set of identifiers of the destination computing device from the destination computing device, wherein the set of identifiers of the destination computing device includes a version associated with the destination computing device and a unique identifier of the destination computing device, and wherein the set of identifiers is usable by the source computing device to determine a set of casting session parameters, (iii) receive the set of casting session parameters from the source computing device, and (iv) transmit an acknowledgment to the source computing device, wherein the acknowledgment indicates the set of casting session parameters were received by the destination computing device; and a digital media content rending module to (i) receive content casted from the source computing device and (ii) render the received content based on the set of casting session parameters.

Example 28 includes the subject matter of Example 27, and wherein to receive the set of identifiers of the source computing device comprises to receive a request for one or more protocol methods supported by the source computing device, wherein the request for the one or more protocol methods supported by the source computing device includes the set of identifiers of the source computing device.

Example 29 includes the subject matter of any of Examples 27 and 28, and wherein to transmit the set of identifiers of the destination computing device to the source computing device comprises to transmit, subsequent to having received the request for one or more protocol methods supported by the source computing device, a response that includes the one or more protocol methods supported by the destination computing device and the set of identifiers of the destination computing device.

Example 30 includes the subject matter of any of Examples 27-29, and wherein the plurality of instructions further cause the destination computing device to receive, prior to receiving the set of identifiers of the source computing device, an internet protocol (IP) address of the source computing device; transmit, subsequent to having received the IP address of the source computing device, an IP address of the destination computing device; and establish a communication channel between the source computing device and the destination computing device using the IP address of the source computing device and the IP address of the destination computing device, wherein to transmit the set of identifiers of the destination computing device to the source computing device comprises to transmit the set of identifiers of the destination computing device via the communication channel.

Example 31 includes the subject matter of any of Examples 27-30, and wherein the plurality of instructions further cause the destination computing device to establish, subsequent to having transmitted the subset of casting session parameters to the destination computing device, a casting session between the source computing device and the destination computing device based on the one or more capabilities of the destination computing device, wherein to receive the content casted from the source computing device comprises to receive digital media content casted from the source computing device during the casting session, and wherein to render the received content comprises to render the digital media content received from the source computing device during the casting session.

Example 32 includes the subject matter of any of Examples 27-31, and wherein the set of identifiers of the source computing device includes a unique identifier of a manufacturer of the source computing device, a version of an operating system executing on the source computing device, a version of a standard employable by the source computing device, and a version of the manufacturer of the source computing device.

Example 33 includes the subject matter of any of Examples 27-32, and wherein the set of identifiers of the destination computing device includes a unique identifier of a manufacturer of the destination computing device, a version of an operating system executing on the destination computing device, a version of a standard employable by the destination computing device, and a version of the manufacturer of the destination computing device.

Example 34 includes a method for rendering casted digital media content, the method comprising receiving, by a destination computing device, a set of identifiers of a source computing device from the source computing device, wherein the set of identifiers of the source computing device includes a version associated with the source computing device and a unique identifier of the source computing device; transmitting, by the destination computing device, a set of identifiers of the destination computing device from the destination computing device, wherein the set of identifiers of the destination computing device includes a version associated with the destination computing device and a unique identifier of the destination computing device, and wherein the set of identifiers is usable by the source computing device to determine a set of casting session parameters; receiving, by the destination computing device, the set of casting session parameters from the source computing device; transmitting, by the destination computing device, an acknowledgment to the source computing device, wherein the acknowledgment indicates the set of casting session parameters were received by the destination computing device; receiving, by the destination computing device, content casted from the source computing device; and rendering, by the destination computing device, the received content based on the set of casting session parameters.

Example 35 includes the subject matter of Example 34, and wherein receiving the set of identifiers of the source computing device comprises receiving a request for one or more protocol methods supported by the source computing device, wherein the request for the one or more protocol methods supported by the source computing device includes the set of identifiers of the source computing device.

Example 36 includes the subject matter of any of Examples 34 and 35, and wherein transmitting the set of identifiers of the destination computing device to the source computing device comprises transmitting, subsequent to receiving the request for one or more protocol methods supported by the source computing device, a response that includes the one or more protocol methods supported by the destination computing device and the set of identifiers of the destination computing device.

Example 37 includes the subject matter of any of Examples 34-36, and further including receiving, by the destination computing device and prior to receiving the set of identifiers of the source computing device, an internet protocol (IP) address of the source computing device; transmitting, by the destination computing device and subsequent to receiving the IP address of the source computing device, an IP address of the destination computing device; and establishing, by the destination computing device, a communication channel between the source computing device and the destination computing device using the IP address of the source computing device and the IP address of the destination computing device, wherein transmitting the set of identifiers of the destination computing device to the source computing device comprises transmitting the set of identifiers of the destination computing device via the communication channel.

Example 38 includes the subject matter of any of Examples 34-37, and further including establishing, by the destination computing device and subsequent to transmitting the subset of casting session parameters to the destination computing device, a casting session between the source computing device and the destination computing device based on the one or more capabilities of the destination computing device, wherein receiving the content casted from the source computing device comprises receiving digital media content casted from the source computing device during the casting session, and wherein rendering the received content comprises rendering the digital media content received from the source computing device during the casting session.

Example 39 includes the subject matter of any of Examples 34-38, and wherein receiving the set of identifiers of the source computing device comprises receiving at least one of a unique identifier of a manufacturer of the source computing device, a version of an operating system executing on the source computing device, a version of a standard employable by the source computing device, and a version of the manufacturer of the source computing device.

Example 40 includes the subject matter of any of Examples 34-39, and wherein transmitting the set of identifiers of the destination computing device comprises transmitting at least one of a unique identifier of a manufacturer of the destination computing device, a version of an operating system executing on the destination computing device, a version of a standard employable by the destination computing device, and a version of the manufacturer of the destination computing device.

Example 41 includes a destination computing device comprising a processor; and a memory having stored therein a plurality of instructions that when executed by the processor cause the destination computing device to perform the method of any of Examples 34-40.

Example 42 includes one or more machine readable storage media comprising a plurality of instructions stored thereon that in response to being executed result in a destination computing device performing the method of any of Examples 34-40.

Example 43 includes a destination computing device for rendering casted digital media content, the destination computing device comprising means for receiving a set of identifiers of a source computing device from the source computing device, wherein the set of identifiers of the source computing device includes a version associated with the source computing device and a unique identifier of the source computing device; means for transmitting a set of identifiers of the destination computing device from the destination computing device, wherein the set of identifiers of the destination computing device includes a version associated with the destination computing device and a unique identifier of the destination computing device, and wherein the set of identifiers is usable by the source computing device to determine a set of casting session parameters; means for receiving the set of casting session parameters from the source computing device; means for transmitting an acknowledgment to the source computing device, wherein the acknowledgment indicates the set of casting session parameters were received by the destination computing device; means for receiving content casted from the source computing device; and means for rendering the received content based on the set of casting session parameters.

Example 44 includes the subject matter of Example 43, and wherein the means for receiving the set of identifiers of the source computing device comprises means for receiving a request for one or more protocol methods supported by the source computing device, wherein the request for the one or more protocol methods supported by the source computing device includes the set of identifiers of the source computing device.

Example 45 includes the subject matter of any of Examples 43 and 44, and wherein the means for transmitting the set of identifiers of the destination computing device to the source computing device comprises means for transmitting, subsequent to receiving the request for one or more protocol methods supported by the source computing device, a response that includes the one or more protocol methods supported by the destination computing device and the set of identifiers of the destination computing device.

Example 46 includes the subject matter of any of Examples 43-45, and further including means for receiving, prior to receiving the set of identifiers of the source computing device, an internet protocol (IP) address of the source computing device; means for transmitting, subsequent to receiving the IP address of the source computing device, an IP address of the destination computing device; and means for establishing a communication channel between the source computing device and the destination computing device using the IP address of the source computing device and the IP address of the destination computing device, wherein the means for transmitting the set of identifiers of the destination computing device to the source computing device comprises means for transmitting the set of identifiers of the destination computing device via the communication channel.

Example 47 includes the subject matter of any of Examples 43-46, and further including means for establishing, subsequent to transmitting the subset of casting session parameters to the destination computing device, a casting session between the source computing device and the destination computing device based on the one or more capabilities of the destination computing device, wherein the means for receiving the content casted from the source computing device comprises means for receiving digital media content casted from the source computing device during the casting session, and wherein the means for rendering the received content comprises means for rendering the digital media content received from the source computing device during the casting session.

Example 48 includes the subject matter of any of Examples 43-47, and wherein the means for receiving the set of identifiers of the source computing device comprises means for receiving at least one of a unique identifier of a manufacturer of the source computing device, a version of an operating system executing on the source computing device, a version of a standard employable by the source computing device, and a version of the manufacturer of the source computing device.

Example 49 includes the subject matter of any of Examples 43-48, and wherein the means for transmitting the set of identifiers of the destination computing device comprises means for transmitting at least one of a unique identifier of a manufacturer of the destination computing device, a version of an operating system executing on the destination computing device, a version of a standard employable by the destination computing device, and a version of the manufacturer of the destination computing device.

The invention claimed is:

1. A first device comprising:
   at least one memory;
   instructions;
   first circuitry to:
      transmit at least one message that identifies a first set of cast session capabilities to a second device that initiated a cast session with the first device; and
      transmit first version information to the second device, the first version information associated with the first device; and
   second circuitry to execute the instructions to at least:
      identify the first set of cast session capabilities from a second set of cast session capabilities of the first device, the first set of cast session capabilities to be identified based on second version information included in identification information from the second device, the second version information associated with the second device; and
      obtain, from the second device, a set of cast session parameters for the cast session, the set of cast session parameters based on the first set of cast session capabilities identified in the at least one message and the first version information transmitted to the second device.

2. The first device of claim 1, wherein the first set of cast session capabilities is a subset of the second set of cast session capabilities of the first device.

3. The first device of claim 1, wherein the second circuitry is to:
   establish the cast session with the second device; and
   render media obtained from the second device via the cast session, the media to be rendered based on the set of cast session parameters.

4. The first device of claim 1, wherein:
   the second circuitry is to identify a first set of cast session protocols from a second set of cast session protocols of the first device, the first set of cast session protocols to be identified based on the identification information from the second device; and
   the first circuitry is to transmit at least one message that identifies the first set of cast session protocols to the second device.

5. The first device of claim 4, wherein the identification information is first identification information, and:
   the first circuitry is to transmit second identification information of the first device to the second device; and
   the second circuitry is to obtain, from the second device, information that identifies a third set of cast session protocols of the second device, the third set of cast session protocols based on the second identification information transmitted to the second device.

6. At least one machine-readable storage medium including at least one machine-readable memory, machine-readable storage disc, or machine readable storage device, the at least one machine-readable storage medium comprising machine-readable instructions that, when executed, cause one or more processors of a first device to at least:
   identify a first set of cast session capabilities from a second set of cast session capabilities of the first device, the first set of cast session capabilities to be identified based on first version information included in identification information from a second device that is to initiate a cast session with the first device, the first version information associated with the second device;
   cause at least one message that identifies the first set of cast session capabilities to be transmitted to the second device;
   transmit second version information to the second device, the second version information associated with the first device; and
   obtain, from the second device, a set of cast session parameters for the cast session, the set of cast session parameters based on the first set of cast session capabilities identified in the at least one message and the second version information transmitted to the second device.

7. The at least one machine-readable storage medium of claim 6, wherein the first set of cast session capabilities is a subset of the second set of cast session capabilities of the first device.

8. The at least one machine-readable storage medium of claim 6, wherein the instructions are to cause the one or more processors to:
   establish the cast session with the second device; and
   render media obtained from the second device via the cast session, the media to be rendered based on the set of cast session parameters.

9. The at least one machine-readable storage medium of claim 6, wherein the instructions are to cause the one or more processors to:
   identify a first set of cast session protocols from a second set of cast session protocols of the first device, the first set of cast session protocols to be identified based on the identification information from the second device; and
   cause at least one message that identifies the first set of cast session protocols to be transmitted to the second device.

10. The at least one machine-readable storage medium of claim 9, wherein the identification information is first identification information, and the instructions are to cause the one or more processors to:
    cause second identification information of the first device to be transmitted to the second device; and
    obtain, from the second device, information that identifies a third set of cast session protocols of the second device, the third set of cast session protocols based on the second identification information transmitted to the second device.

11. A method comprising:
    identifying, by executing an instruction with at least one processor of a first device, a first set of cast session capabilities from a second set of cast session capabilities of the first device, the first set of cast session capabilities to be identified based on first version information included in identification information from a second device that is to initiate a cast session with the first device, the first version information associated with the second device;
    transmitting at least one message that identifies the first set of cast session capabilities to the second device;
    transmitting second version information to the second device, the second version information associated with the first device; and obtaining, from the second device, and by executing an instruction with the at least one processor, a set of cast session parameters for the cast session, the set of cast session parameters based on the first set of cast session capabilities identified in the at least one message and the second version information transmitted to the second device.

12. The method of claim 11, further including:
establishing the cast session with the second device; and
rendering media obtained from the second device via the cast session, the media to be rendered based on the set of cast session parameters.

13. The method of claim 11, further including:
identifying a first set of cast session protocols from a second set of cast session protocols of the first device, the first set of cast session protocols to be identified based on the identification information from the second device; and transmitting at least one message that identifies the first set of cast session protocols to the second device.

14. The method of claim 13, wherein the identification information is first identification information, and further including:
transmitting second identification information of the first device to the second device; and
obtaining, from the second device, information that identifies a third set of cast session protocols of the second device, the third set of cast session protocols based on the second identification information transmitted to the second device.

15. The method of claim 11, wherein the first set of cast session capabilities is a subset of the second set of cast session capabilities of the first device.

* * * * *